("12") United States Patent  
Yeh et al.

(10) Patent No.: US 8,947,628 B2  
(45) Date of Patent: Feb. 3, 2015

(54) METHOD OF CHANGING THE PHYSICAL SHAPE OF A DISPLAY PANEL

(71) Applicants: Kao-Ming Yeh, Tainan (TW); Chiu-Mei Fang, Tainan (CN)

(72) Inventors: Kao-Ming Yeh, Tainan (TW); Chiu-Mei Fang, Tainan (CN)

( * ) Notice: Subject to any disclaimer, the term of this patent is extended or adjusted under 35 U.S.C. 154(b) by 264 days.

(21) Appl. No.: 13/691,228

(22) Filed: Nov. 30, 2012

(65) Prior Publication Data

US 2014/0152950 A1    Jun. 5, 2014

(51) Int. Cl.
*G02F 1/1339*    (2006.01)
*G02F 1/13*     (2006.01)

(52) U.S. Cl.
CPC .................................... *G02F 1/1339* (2013.01)
USPC ............................ 349/190; 349/153; 349/187

(58) Field of Classification Search
CPC ..................................................... G02F 1/1339
USPC ......................... 349/153–154, 158, 187, 190
See application file for complete search history.

(56) References Cited

U.S. PATENT DOCUMENTS 6,222,604 B1 * 4/2001 Suginoya et al. ............. 349/158
6,646,711 B2 * 11/2003 Sugano ........................ 349/187

* cited by examiner

*Primary Examiner* — Dung Nguyen
(74) *Attorney, Agent, or Firm* — Kilpatrick Townsend & Stockton LLP (57) ABSTRACT

A method of changing the physical shape of a display panel includes: immersing a portion of the display panel into a solution of an adhesive; and cutting the portion of the display panel along a cutting line in the solution so as to divide the display panel into an excess display part and a target display part that is separated from the excess display part and that has an end segment wrapped with a layer of the adhesive to form a shape-modified display panel.

4 Claims, 8 Drawing Sheets

METHOD OF CHANGING THE PHYSICAL SHAPE OF A DISPLAY PANEL

BACKGROUND OF THE INVENTION

1. Field of the Invention

This invention relates to a method of changing the physical shape of a display panel, more particularly to a method involving cutting a display panel in a solution of an adhesive.

2. Description of the Related Art

There is a need for manufacturing different sizes of liquid crystal display panels for different applications, such as televisions, computer displays, control panels, and advertisement displays. However, the cost of producing different sizes of the liquid crystal display panels, particularly for customized ones, is relatively high for the manufacturers.

Figure 1:
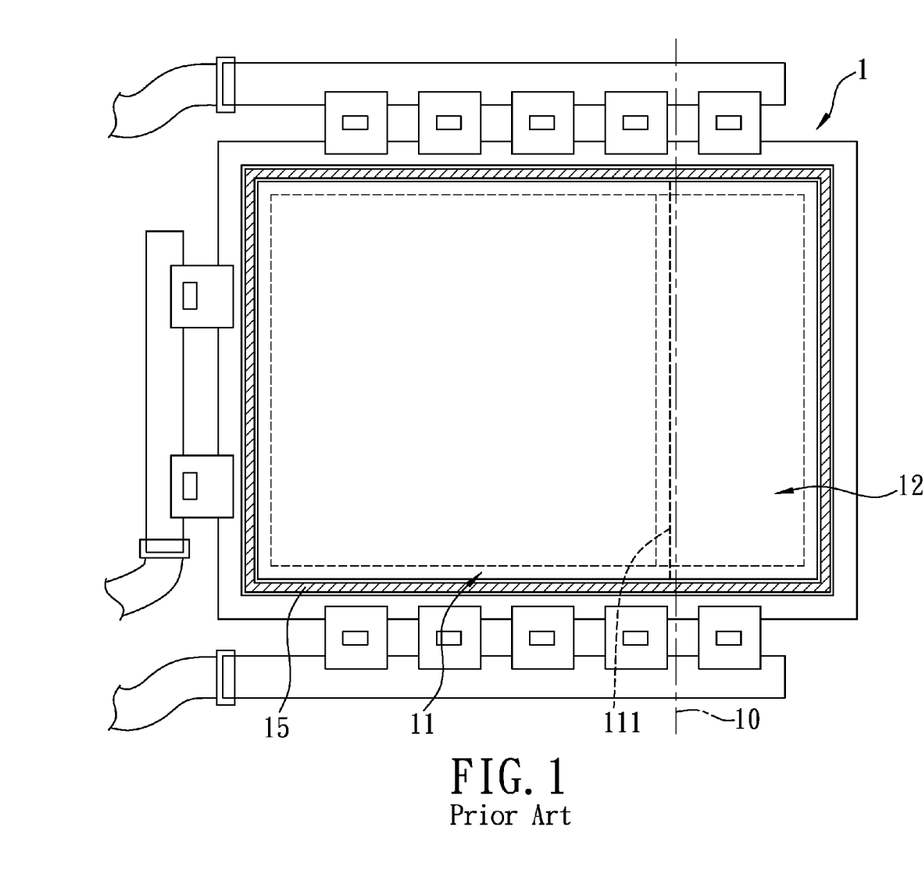
FIG. 1 is a fragmentary schematic top view of a conventional Off-The-Shelf (COTS) display panel.
Figure 2:
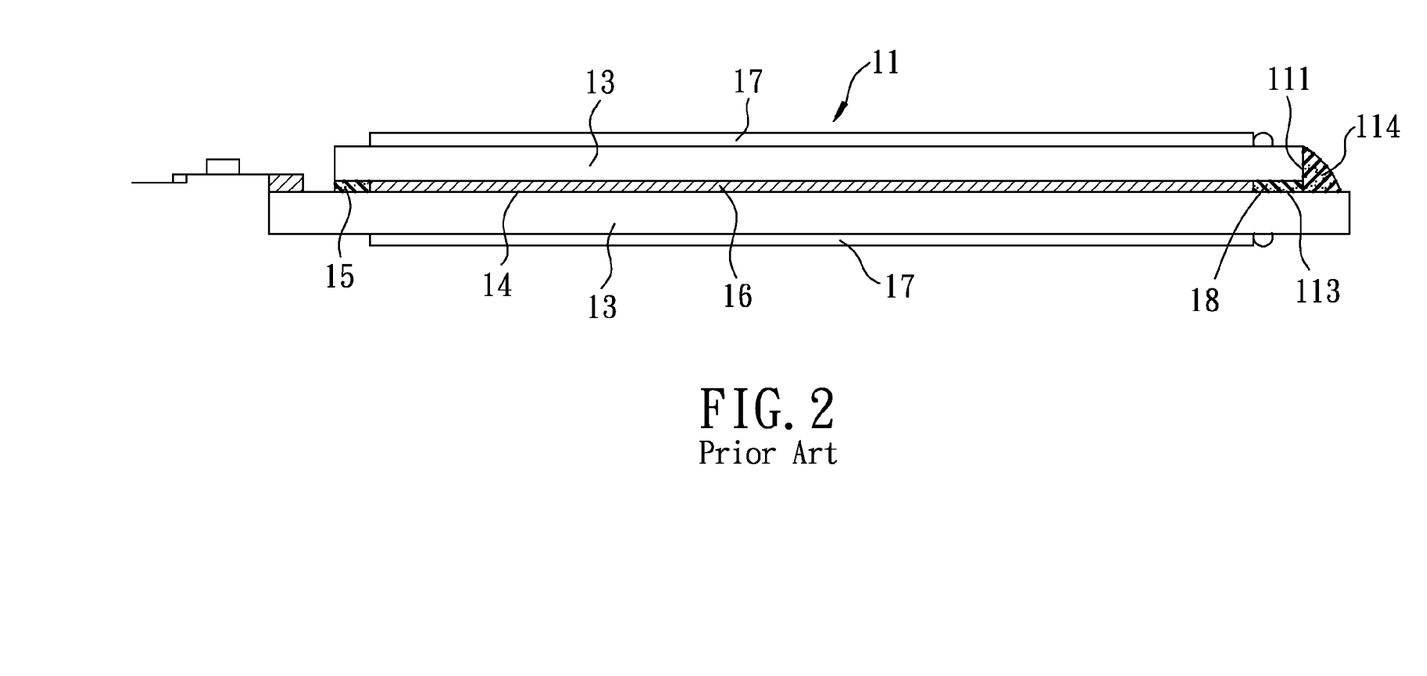
FIG. 2 is a sectional view of a customized display panel formed by cutting the COTS display panel of FIG. 1, followed by resealing.

As illustrated in FIGS. 1 and 2, U.S. Pat. No. 7,525,633 discloses a method of changing the physical shape of a Commercial Off-The-Shelf (COTS) display panel 1. The COTS display panel 1 includes first and second substrates 13, an image-generating medium 16 stored in a storing space 14 between the first and second substrates 13, a perimeter seal 15 spacing apart the first and second substrates 13 and cooperating with the first and second substrates 13 to seal a perimeter opening between edges of the first and second substrates 13, and two polarizer films 17 attached to the first and second substrates 13, respectively. The method includes the steps of: cutting the COTS display panel 1 along a cutting line 10 that divides the COTS display panel 1 into an excess display portion 12 and a target display portion 11; removing a portion of the image-generating medium 16 along an exposed edge 111 of the target display portion 11 formed by the cutting; applying an adhesive 18 that flows between the first and second substrates 13 such that the adhesive 18 contacts inner surfaces of the first and second substrates 13 and forms a first seal along the exposed edge 111; and applying a second seal 114 over the first seal so as to form the target display portion 11 into a customized display panel having desired dimensions.

The aforementioned method is disadvantageous in that a portion of the image-generating medium 16 is required to be removed for creating a sealing space 113 between the first and second substrates 13 for application of the adhesive 18 therein. In addition, the created sealing space 113 between the first and second substrates 13 is relatively narrow. As a consequence, application of the adhesive 18 into the sealing space 113 is relatively difficult.

SUMMARY OF THE INVENTION

Therefore, an object of the present invention is to provide a method of changing the physical shape of a display panel that can overcome the aforesaid drawback associated with the prior art.

According to the present invention, there is provided a method of changing the physical shape of a display panel. The display panel includes front and back plates spaced apart from each other, an image-generating medium contained in a storing space between the front and back plates, and a perimeter sealant sealing a perimeter opening between edges of the front and back plates. The method comprises: immersing a portion of the display panel into a solution of an adhesive; and cutting the portion of the display panel along a cutting line in the solution so as to divide the display panel into an excess display part and a target display part that is separated from the excess display part and that has an end segment wrapped with a layer of the adhesive to form a shape-modified display panel.

BRIEF DESCRIPTION OF THE DRAWINGS

In drawings which illustrate an embodiment of the invention.

DETAILED DESCRIPTION OF THE PREFERRED EMBODIMENT

FIGS. 3A to 3E illustrate the consecutive steps of the preferred embodiment of a method of changing the physical shape of a display panel 2 according to the present invention. The display panel 2 can be a COTS display panel, and includes front and back plates 201 spaced apart from each other, an image-generating medium 27 contained in a storing space 25 between the front and back plates 201, and a perimeter sealant 26 sealing a perimeter opening 2010 between edges of the front and back plates 201. Each of the front and back plates 201 has a substrate 23 and a polarizer film 24 attached to the substrate 23. The substrates 23 of the front and back plates 201 are disposed between the polarizer films 24 of the front and back plates 201.

Figure 4:
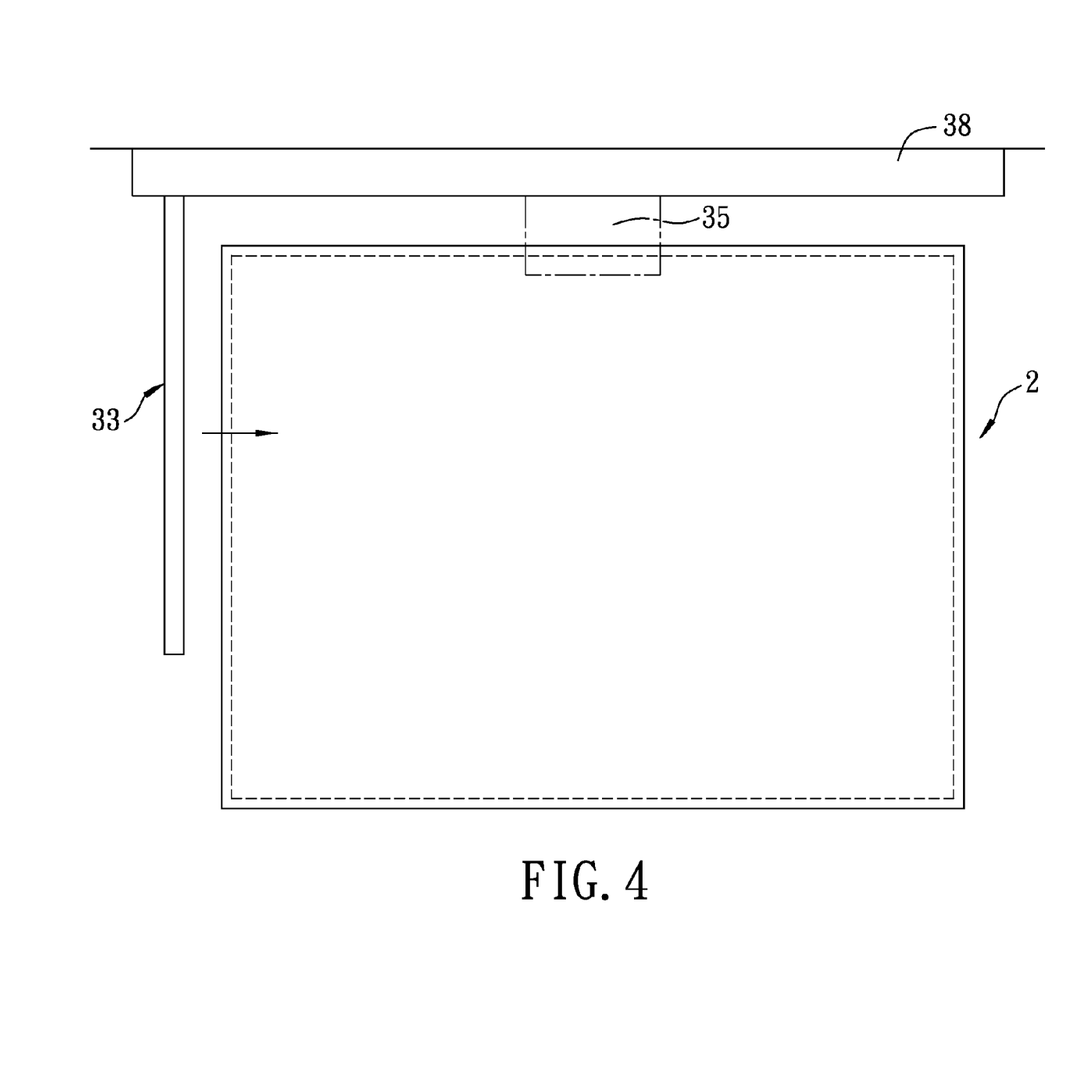
FIG. 4 is a schematic side view illustrating how the display panel is held by a panel holder and is to be cut by a cutter according to the preferred embodiment.
Figure 5:
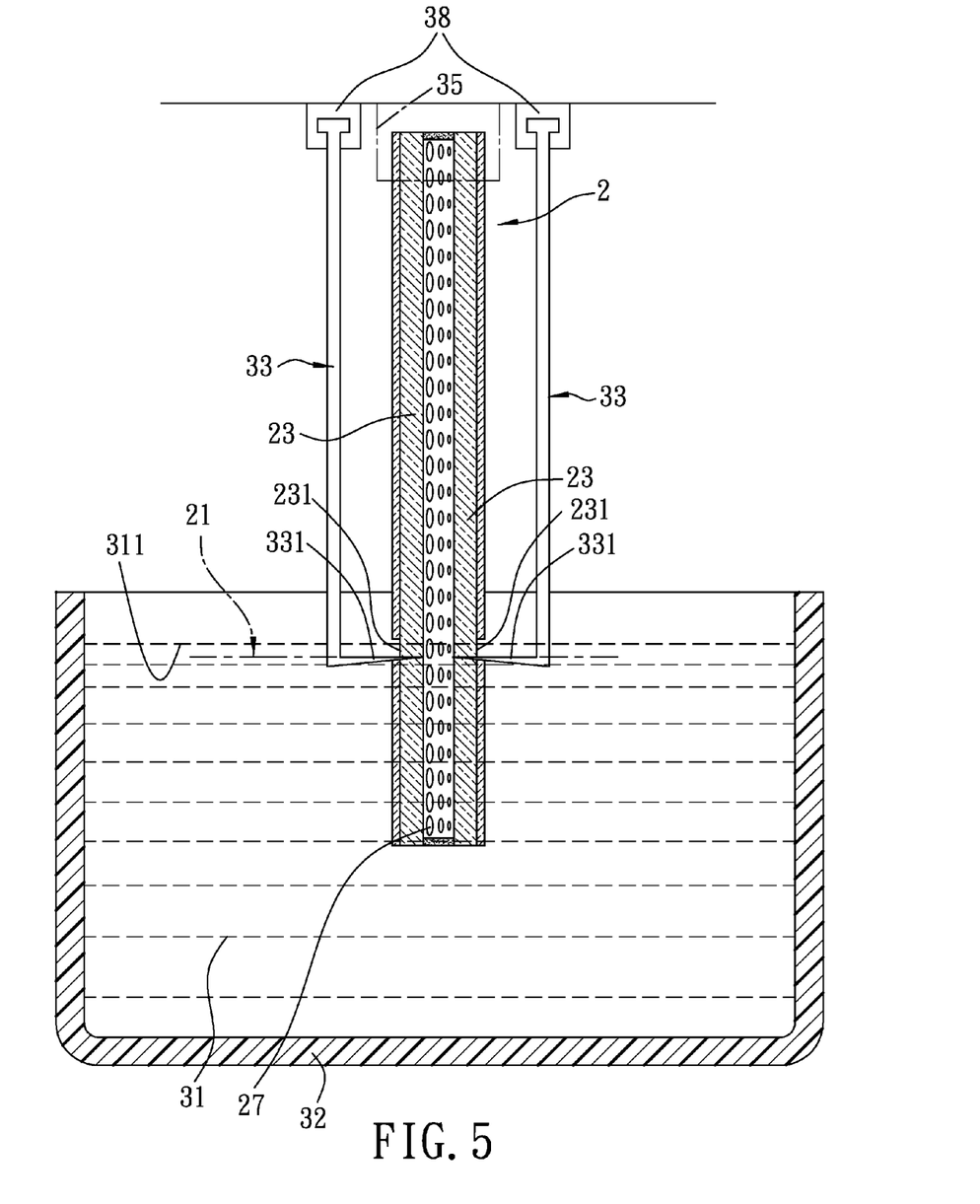
FIG. 5 is a sectional view illustrating how the display panel is cut by the cutter in a solution of an adhesive according to the preferred embodiment.

The method comprises: preparing the display panel 2 (see FIG. 3A); precutting the front and back plates 201 such that each of the front and back plates 201 is formed with a trough 2011 (see FIG. 3B) that is separated from the storing space 25, the trough 2011 in each of the front and back plates 201 extending from an outer surface 241 of a respective one of the polarizer films 24 to an inner surface 242 of the respective one of the polarizer films 24 so as to expose a cutting area 231 of each of the substrates 23; holding the display panel 2 on a panel holder 35 of a support (see FIG. 4); immersing a portion of the display panel 2 held by the panel holder 35 into a solution of an adhesive 31 in a container 32 after the precutting such that a major portion of the cutting area 231 of each of the substrates 23 is immersed in the solution of the adhesive 31 and the remainder of the cutting area 231 of each of the substrates 23 is disposed above a surface 311 of the solution of the adhesive 31 (see FIGS. 3C and 5); disposing cutting blades 331 of a pair of cutters 33 in the solution of the adhesive 31 and aligning the cutting blades 331 with the cutting areas 231 of the substrates 23 along a cutting line 21 (see FIGS. 3C and 5), the cutters 33 being mounted movably on the support 38; cutting the portion of the display panel 2 along the cutting line 21 in the solution using the cutting blades 331 (see FIG. 3D) so as to divide the display panel 2 into an excess display part 22 and a target display part 20 that is separated from the excess display part 22 and that has an end segment 205 wrapped with a layer 29 of the adhesive 31 (see FIG. 3E) to form a shape-modified display panel 200; and removing the shape-modified display 200 from the solution of the adhesive 31. The end segment 205 of the target display part 20 defines an end opening 2050 that is formed by the cutting, that is in fluid communication with the storing space 25, and that is sealed by the layer 29 of the adhesive 31. The excess display part 22 also defines an end opening formed by the cutting and sealed by the adhesive 31. The excess display part 22 can be collected for disposal or for recycle.

In this embodiment, the image-generating medium 27 is a liquid crystal material. The adhesive 31 employed in the method of this invention can be those adhesives that are conventionally used in the sealing of the perimeter opening 2010 between the edges of the front and back plates 201, and preferably has a density greater than that of the image-generating medium 27 so that the image-generating medium 27 can remain in the storing space 25 upon formation of the end opening 2050 in the end segment 205 of the target display part 20.

Figures 3A, 3B, 3C:
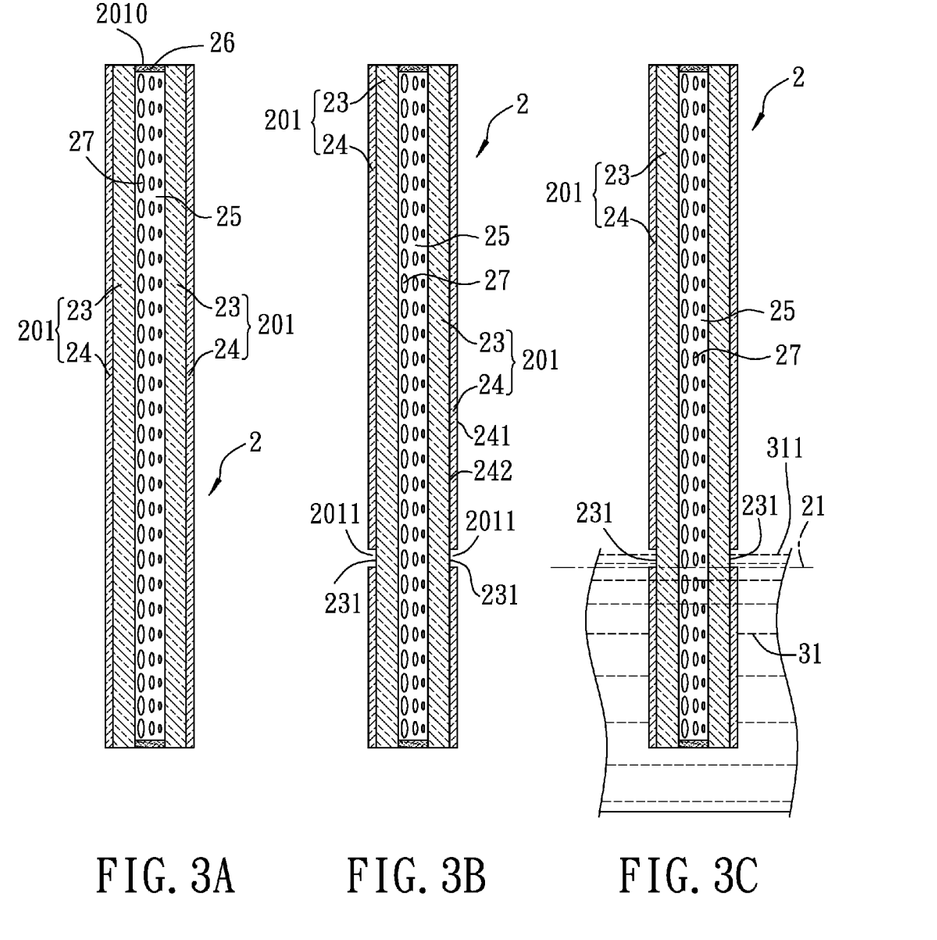
FIGS. 3A to 3E are sectional views illustrating consecutive steps of the preferred embodiment of a method of changing the physical shape of a display panel according to the present invention.
Figure 3D:
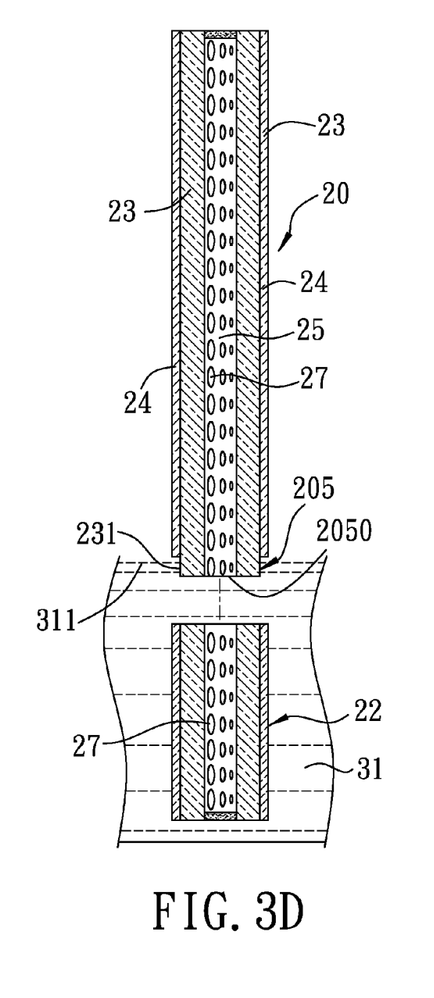
Figure 3E:
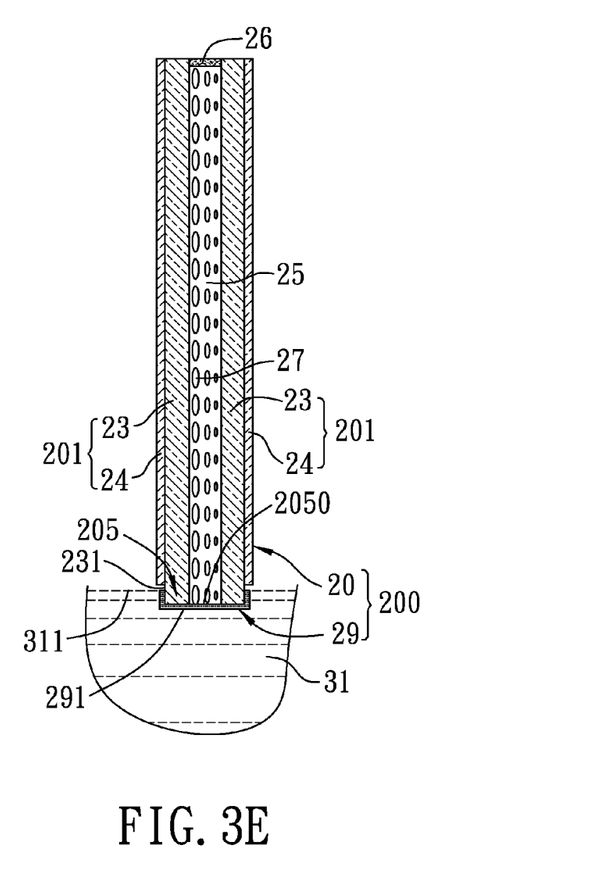
Figure 6:
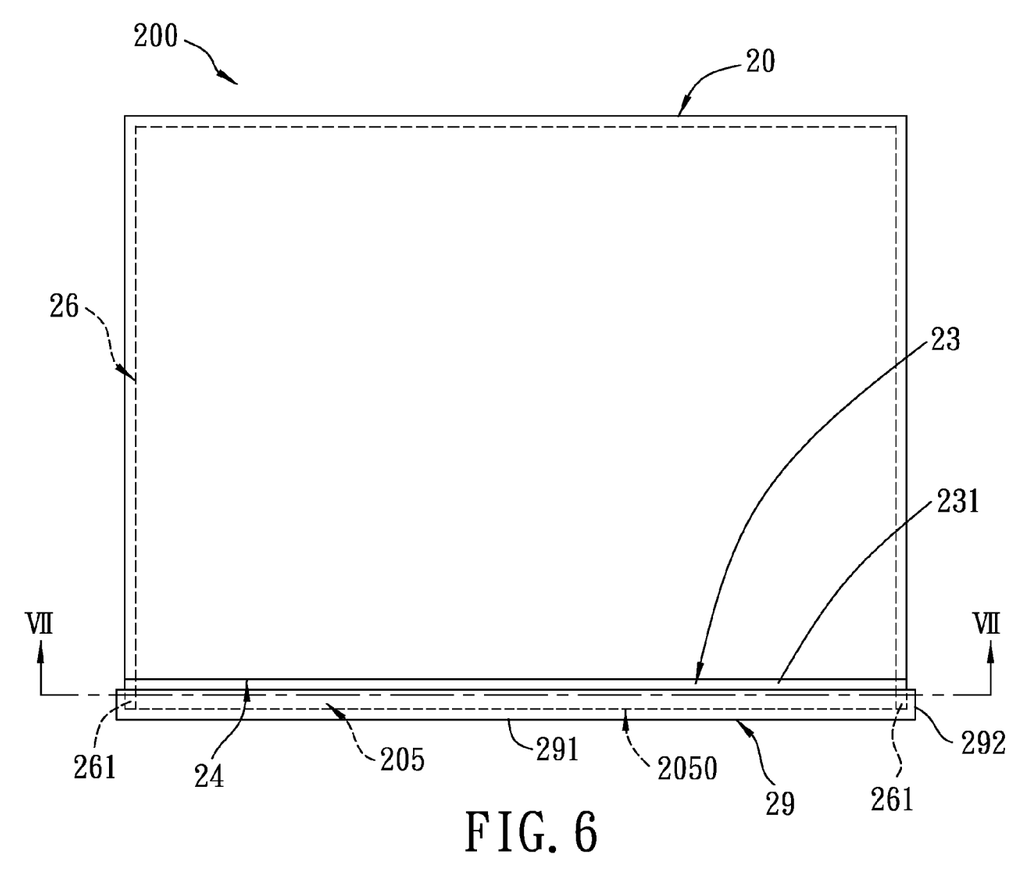
FIG. 6 is a schematic top view of a shape-modified display panel formed according to the preferred embodiment.
Figure 7:
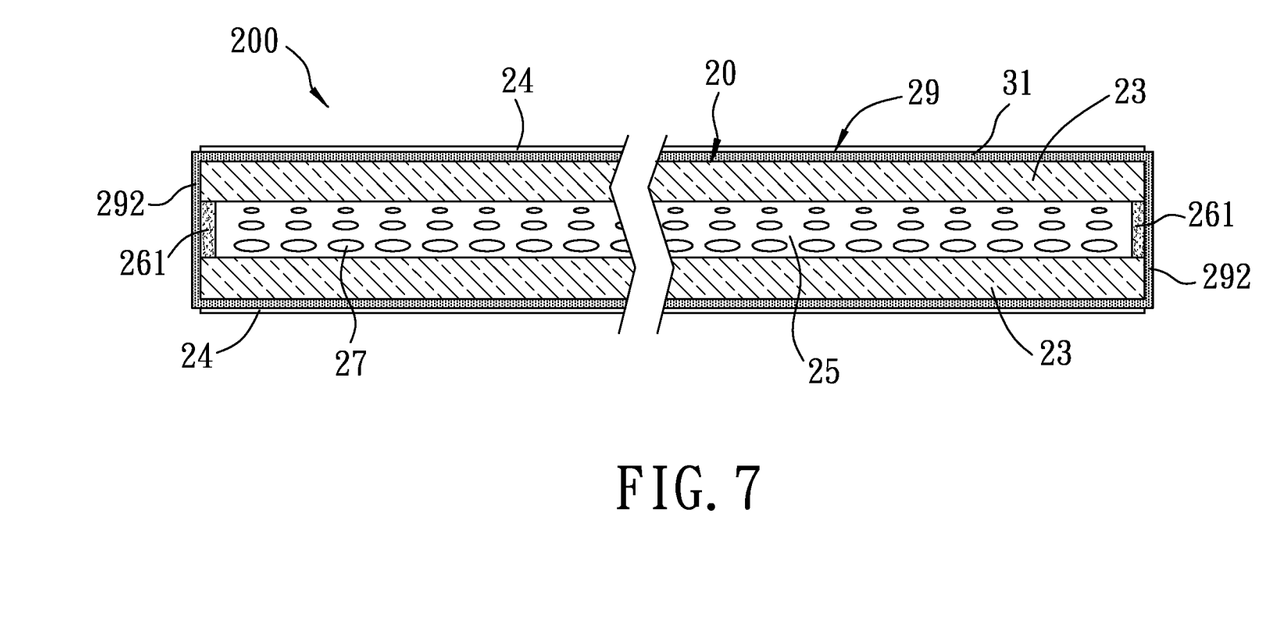
FIG. 7 is a sectional view taken along lines VII-VII of FIG. 6.

As illustrated in FIGS. 6 and 7, in combination with FIG. 3E, after the cutting, the perimeter sealant 26 of the target display part 20 of the shape-modified display panel 200 is formed into a U-shape structure having two opposite end portions 261 disposed at the end segment 205. The layer 29 of the adhesive 31 is hat-shaped, and has a first side 291 that seals the end opening 2050 of the end segment 205 of the target display part 20 and that is in direct contact with the image-generating medium 27, and two opposite second sides 292 that contact and overlap the end portions 261 of the perimeter sealant 26, respectively.

It should be noted that, as mentioned in U.S. Pat. No. 7,525,633, when the display panel 2 is cut, internal electronics integrated therewith might also be cut, and thus reestablishment of electrical continuity is often required. Electronic drivers may need to be reattached to the shape-modified display panel 200. Additional modifications and/or enhancements may be made to the display panel 2 during reshaping and/or resizing. For example, electric circuits may be replaced and/or supplemented with circuits having different functionality. Then, a custom bezel and frame may then be used to house the shape-modified display panel 200. The entire disclosure of U.S. Pat. No. 7,525,633 is hereby incorporated by reference.

By disposing a portion of the display panel 2 in the solution of the adhesive 31 and then cutting the portion of the display panel 2 in the solution to form the shape-modified display panel 200 according to the method of this invention, the aforesaid drawback associated with the prior art can be eliminated. Moreover, since the cutting is conducted in the solution of the adhesive 31, the end segment 205 of the target display part 20 is immediately wrapped with the layer 29 of the adhesive 31 as soon as it is formed in the solution. As such, the method of this invention is faster and simpler as compared to the aforesaid conventional method of the prior art.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of changing the physical shape of a display panel, the display panel including front and back plates spaced apart from each other, an image-generating medium contained in a storing space between the front and back plates, and a perimeter sealant sealing a perimeter opening between edges of the front and back plates, the method comprising:
   immersing a portion of the display panel into a solution of an adhesive; and
   cutting the portion of the display panel along a cutting line in the solution so as to divide the display panel into an excess display part and a target display part that is separated from the excess display part and that has an end segment wrapped with a layer of the adhesive to form a shape-modified display panel.

2. The method of claim 1, further comprising precutting the front and back plates before immersing the portion of the display panel into the solution of the adhesive such that each of the front and back plates is formed with a trough that is separated from the storing space.

3. The method of claim 2, wherein each of the front and back plates has a substrate and a polarizer film attached to the substrate, the substrates of the front and back plates being disposed between the polarizer films of the front and back plates, the trough in each of the front and back plates extending from an outer surface of a respective one of the polarizer films to an inner surface of the respective one of the polarizer films so as to expose a cutting area of each of the substrates.

4. A shape-modified display panel formed by the method of claim 1, wherein the perimeter sealant is formed into a U-shape structure having two opposite end portions, the end segment of the target display part defining an end opening formed by the cutting, the layer of the adhesive being hat-shaped and having a first side that seals the end opening and that is in direct contact with the image-generating medium, and two opposite second sides that contact and overlap the end portions of the perimeter sealant, respectively.

* * * * *